United States Patent [19]

Kendrick

[11] 3,967,842
[45] July 6, 1976

[54] HIGH PRESSURE TUBULAR SWIVEL JOINT
[75] Inventor: William D. Kendrick, Duncan, Okla.
[73] Assignee: Halliburton Company, Duncan, Okla.
[22] Filed: Sept. 22, 1975
[21] Appl. No.: 615,791

[52] U.S. Cl. .............................. 285/276; 285/94; 285/371; 285/DIG. 11; 285/14
[51] Int. Cl.$^2$ ........................................ F16L 27/00
[58] Field of Search ........... 285/276, 275, 272, 370, 285/371, 98, 122, 136, 168, DIG. 11, 282, 365, 366, 367, 14

[56] References Cited
UNITED STATES PATENTS

| 2,501,680 | 5/1950 | King | 285/98 |
|---|---|---|---|
| 3,129,960 | 4/1964 | Schrodt | 285/275 X |
| 3,216,746 | 11/1965 | Watts | 285/370 X |
| 3,497,244 | 2/1970 | Grantom | 285/276 X |
| 3,554,581 | 1/1971 | Mason et al. | 285/367 |
| 3,776,578 | 12/1973 | Jessup et al. | 285/94 |

FOREIGN PATENTS OR APPLICATIONS

| 672,991 | 11/1965 | Belgium | 285/276 |
|---|---|---|---|
| 6,507,214 | 12/1965 | Netherlands | 285/367 |
| 417,249 | 1/1967 | Switzerland | 285/276 |

*Primary Examiner*—Wayne L. Shedd
*Attorney, Agent, or Firm*—John H. Tregoning; Bruce E. Burdick

[57] ABSTRACT

A swivel joint and connection for abutting high pressure hydraulic manifolds, the joint comprising two flanged non-rotating swivel bodies with one of the non-rotating swivel bodies having a rotating swivel body journaled therein. A flanged tubular sleeve is secured between the adjacent end faces of the two non-rotating swivel bodies with the opposite ends of the tubular sleeves received respectively in counterbores formed in one non-rotating swivel body and in the rotating swivel body, respectively. A static annular seal is disposed between the first end of the tubular sleeve and the counterbore in the non-rotating swivel body. A resilient dynamic annular seal is disposed between an annular shoulder on the opposite end of the tubular sleeve and a first counterbore in the rotating swivel body. A cylindrical outer surface extends from the annular shoulder of the tubular sleeve within a second counterbore in the rotating swivel body and a sliding annular piston is disposed between the inner surface of the second counterbore and the cylindrical surface of the tubular sleeve. A hydrogen sulfide-resistant liquid is disposed within the annular cavity between the inner wall of the second counterbore and the cylindrical surface of the tubular sleeve intermediate the dynamic annular seal and the annular piston. An annular filter is also positioned between the end face of the tubular sleeve and the second counterbore in the rotating swivel body intermediate the annular piston and the end face of the tubular sleeve.

20 Claims, 2 Drawing Figures

HIGH PRESSURE TUBULAR SWIVEL JOINT

BACKGROUND OF THE INVENTION

1. Field of the Invention

This invention relates generally to improvements in high pressure tubular connections and more particularly, but not by way of limitation, to improvements in high pressure swivel joints.

2. Description of the Prior Art

The prior art contains a number of teachings of high pressure tubular swivel joints. Typical of such swivel joints is that disclosed in U.S. Pat. No. 3,347,570 to H. W. Roessler. In general, the prior art high pressure tubular swivel joints employ elastomeric dynamic annular seals to provide effective sliding sealing engagement between the rotating and non-rotating elements of the swivel joints. The use of elastomeric ompounds in the construction of such dynamic annular seals is dictated by the excellent sealing characteristics of such materials.

When the fluids being passed through the prior art swivel joints, employing elastomeric annular seals, are highly corrosive in nature and contain hydrogen sulfide or the like, seal life in the swivel joints is adversely affected. The present invention provides seal structure in which the dynamic seal is isolated from corrosive fluids, such as those containing hydrogen sulfide, passing through the swivel joint by an annular chamber positioned therebetween containing a liquid which is unaffected by contact with hydrogen sulfide and does not attack the elastomeric material from which the resilient dynamic annular seal is constructed.

SUMMARY OF THE INVENTION

The present invention contemplates a swivel joint comprising a first swivel body having a first end. The first swivel body has an end face on the first end thereof and a passage extending through the first swivel body communicating with the first end. The swivel joint further includes a second swivel body having a first end and a second end, the second swivel body having an end face on the first end thereof and a passage extending through the second swivel body communicating the first and second ends and including a cylindrical inner surface.

The swivel joint also includes a third swivel body having a first end and having a passage extending therethrough communicating with the first end thereof. The third swivel body also has a cylindrical outer surface, the cylindrical outer surface of the third swivel body being disposed within the cylindrical inner surface of the second swivel body. The passage through the third swivel body includes a first cylindrical inner surface communicating with the first end of the third swivel body, a second cylindrical inner surface having a diameter less than the diameter of the first cylindrical inner surface, a first annular shoulder extending between the first and second cylindrical inner surfaces, a third inner surface having a diameter less than the diameter of the second cylindrical inner surface, and a second annular shoulder extending between the second cylindrical inner surface and the third inner surface.

Also included in the swivel joint is a sleeve having a first end and a second end and a passage extending therethrough communicating the first and second ends. The sleeve includes a first cylindrical outer surface communicating with the first end of the sleeve and received within the passage through the first swivel body. The sleeve also includes a second cylindrical outer surface intermediate the first cylindrical outer surface and the second end of the sleeve. A radially inwardly extending annular shoulder communicates with the second cylindrical outer surface of the sleeve and a third cylindrical outer surface extends from the annular shoulder to the second end of the sleeve. A first end face is formed on the first end of the sleeve and a second end face is formed on the second end of the sleeve. The second cylindrical outer surface of the sleeve extends within the first cylindrical inner surface of the third swivel body and the third cylindrical outer surface of the sleeve extends within the second cylindrical inner surface of the third swivel body.

Static annular seal means are included and are disposed intermediate the first end of the sleeve and the passage through the first swivel body for providing a fluid-tight seal therebetween. Dynamic annular seal means are disposed intermediate the annular shoulder of the sleeve and the first cylindrical inner surface and the first annular shoulder of the third swivel body for providing a sliding, fluid-tight seal between the sleeve and the third swivel body. An annular piston is positioned in mutual sliding sealing engagement between the second cylindrical inner surface of the third swivel body and the third cylindrical outer surface of the sleeve. A quantity of fluid is disposed in the annular space defined by the second cylindrical inner surface of the third swivel body, the third cylindrical outer surface and the annular shoulder of the sleeve, the dynamic annular seal means and the annular piston.

Also included in the swivel joint are rotary bearing means disposed intermediate the cylindrical outer surface of the third swivel body and the cylindrical inner surface of the second swivel body for journally supporting the third swivel body with the second swivel body for rotation about the axis of the cylindrical inner surface of the second swivel body.

Additionally included are means mutually securing the first swivel body, the second swivel body and the sleeve for preventing relative movement therebetween.

Objects and advantages of the invention will be evident from the following detailed description when read in conjunction with the accompanying drawings.

DESCRIPTION OF THE PREFERRED EMBODIMENT

Figures 1, 2:
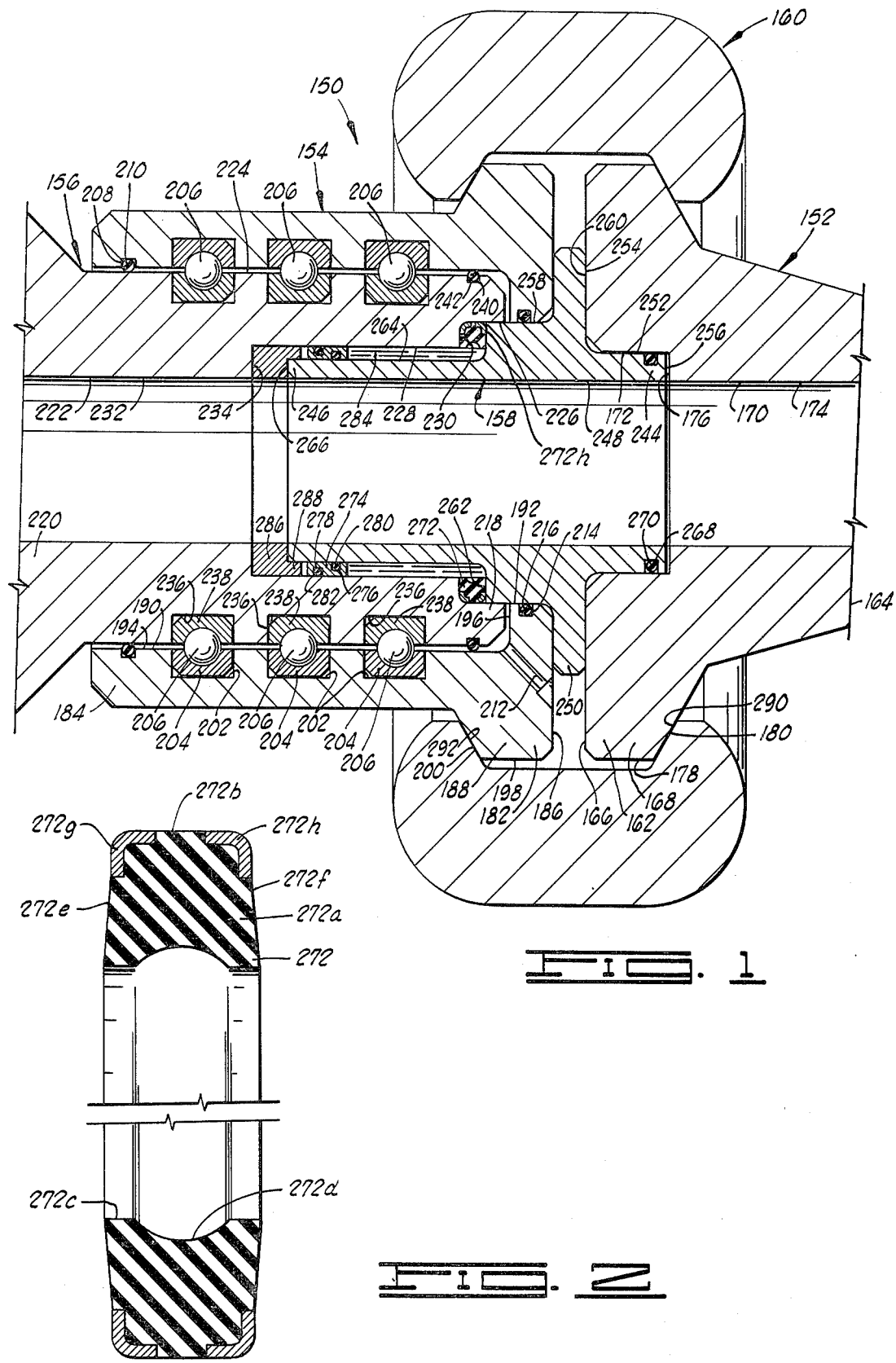
FIG. 1 is a cross-sectional view of a high pressure tubular swivel joint constructed in accordance with the present invention.
FIG. 2 is an enlarged cross-sectional view of the dynamic seal employed in the apparatus of FIG. 1.

FIG. 1 illustrates a high pressure tubular swivel joint generally designated by the reference character 150 adapted to handle high pressure corrosive or otherwise dangerous fluids including fluids carrying a quantity of hydrogen sulfide therein. The swivel joint 150 provides dynamic, rotating seal means for isolating the annular elastomeric sealing member from contact with deleterious fluids such as hydrogen sulfide.

The swivel joint 150 includes a first non-rotating swivel body 152, a second non-rotating swivel body 154, a rotating or third swivel body 156, a tubular sleeve 158 and a segmental, radially expansible and contractile clamp 160.

The first swivel body 152 has a first end 162 and a second end 164 with a radial end face 166 formed on the first end 162. A radially outwardly extending flange 168 is formed on the first end 162 adjacent the end face 166. A longitudinal passage 170 extends through the swivel body 152 providing communication between the first and second ends 162 and 164. The passage 170 includes a first substantially cylindrical inner surface 172 communicating with the end face 166 and a second substantially cylindrical inner surface 174 having a diameter less than the cylindrical surface 172 and a radial annular shoulder 176 lying in a plane substantially normal to the longitudinal axis of the passage 170 extending between the first and second cylindrical surfaces 172 and 174. The flange 168 includes a substantially cylindrical outer periphery 178 with an externally facing annular wedging surface 180 formed thereon communicating with the outer periphery 178.

The second non-rotating swivel body 154 has a first end 182 and a second end 184 with a radial end face 186 formed on the first end 182. A radially outwardly extending flange 188 is formed on the first end 182 adjacent the first end face 186. A longitudinal passage 190 is formed in the swivel body 154 and communicates between the first and second ends 182 and 184. The passage 190 includes a first substantially cylindrical inner surface 192 which communicates with the end face 186, a second substantially cylindrical inner surface 194 coaxial with the inner surface 192 and connected thereto by a radial annular shoulder 196 lying in a plane substantially normal to the axes of the inner surfaces 192 and 194 of the longitudinal passage 190. The second substantially cylindrical inner surface 194 has a diameter greater than the first cylindrical inner surface 192.

The radially outwardly extending flange 188 includes a substantially cylindrical outer periphery 198 having a diameter substantially equal to the outer periphery 178 of the flange 168 of the first swivel body 152. An externally facing annular wedging surface 200 is formed on the flange 188 and communicates with the outer periphery 198 thereof.

A plurality of annular grooves or recesses 202 are formed in the second cylindrical inner surface 194 of the swivel body 154 in longitudinally spaced relation and provide recesses into which relatively hard outer ball bearing races 204 are received in which bearing balls 206 run while journally supporting the rotating swivel body 156 as will be described hereinafter.

An annular groove 208 is formed in the cylindrical inner surface 194 adjacent the second end 184 and intermediate the second end 184 and the bearing races 204. A resilient annular seal 210, preferably an elastomeric or Teflon O-ring, is disposed within the annular groove 208 to provide a rotating seal between the second swivel body 154 and the rotating swivel body 156. A passage 212 is formed in the first end 182 of the second swivel body 154 and communicates between the annular shoulder 196 and the radial end face 186. The passage 212 provides a flow path for any high pressure fluid which might leak from the swivel joint to avoid introducing such fluid into the bearings supporting the rotating swivel body 156. An annular groove 214 is formed in the first substantially cylindrical inner surface 192 and an annular seal 216, also preferably an elastomeric or Teflon O-ring, is disposed within the annular groove 214 to provide a non-rotating seal between the second non-rotating swivel body 154 and the tubular sleeve 158.

The rotating or third swivel body 156 has a first end 218 and a second end 220 with a longitudinal passage 222 extending therethrough communicating between the first and second ends 218 and 220. The rotating swivel body 156 also has a substantially cylindrical outer peripheral surface 224 having a diameter slightly less than the diameter of the second cylindrical inner surface 194 of the second swivel body 154. The rotating swivel body 156 is disposed within the second cylindrical inner surface 194 of the second swivel body 154 with the first end 218 adjacent the annular shoulder 196 of the second swivel body 154.

The longitudinal passage 222 includes a first substantially cylindrical inner surface 226 communicating with the first end 218, a second substantially cylindrical inner surface 288 coaxial with and having a diameter less than the first inner surface 226, a radial annular shoulder 230 extending between the first and second inner surfaces 226 and 228 and lying in a plane substantially normal to the coaxial axes thereof, a third substantially cylindrical inner surface 232 coaxial with the first and second inner surfaces 226 and 228, and a radial annular shoulder 234 extending between the second and third inner surfaces 228 and 232 and lying in a plane substantially normal to the longitudinal axes thereof.

A plurality of annular grooves or recesses 236 are formed in the substantially cylindrical outer peripheral surface 224 of the rotating swivel body 156 in which relatively hard inner ball bearing races 238 are received in which the previously described bearing balls 206 roll to journally support the rotating swivel body 156 within the second non-rotating swivel body 154 to provide relative rotation between the second non-rotating swivel body 154 and the rotating swivel body 156. An annular groove 240 is formed in the cylindrical outer peripheral surface 224 of the rotating swivel body 156 adjacent the first end 218 thereof. A resilient annular seal 242, preferably an elastomeric or Teflon O-ring, is disposed within the annular groove 240 and provides mutual rotating sealing engagement between the rotating swivel body 156 and the second substantially cylindrical inner surface 194 of the second swivel body 154. The previously mentioned annular seal 210 mutually engages the annular groove 208 of the second swivel body 154 and the substantially cylindrical outer peripheral surface 224 of the rotating swivel body 156 to provide a rotating seal therebetween. The annular seals 210 and 242 prevent the entrance of foreign matter into the bearing races 204 and 238 to provide prolonged free rolling of the bearing balls 206 therein and extend bearing life.

The tubular sleeve 158 has a first end 244 and a second end 246 and includes a longitudinal passage 248 extending therethrough communicating between the first and second ends 244 and 246. An outwardly extending radial flange 250 is formed on the exterior of the tubular sleeve 158 intermediate the first and second ends 244 and 246. A first substantially cylindrical outer surface 252 is formed on the tubular sleeve 158 and extends between a first radial face 254 on the radial flange 250 and a first radial end face 256 formed on the first end 244 of the tubular sleeve 158. The first substantially cylindrical outer surface 252 has a diameter slightly less than the diameter of the first substantially cylindrical inner surface 172 of the first non-rotating swivel body 152 and is axially received therein with the first radial face 254 of the radial flange 250 abutting the radial end face 166 of the first swivel body 152. A second substantially cylindrical outer surface 258 is formed on the tubular sleeve 158 and extends from a second radial face 260 formed on the flange 250 toward the second end 246 of the tubular sleeve 158. The cylindrical outer surface 258 has a diameter slightly less than the diameter of the first substantially cylindrical inner surface 192 of the second non-rotating swivel body 154 and also slightly less than the diameter of the first substantially cylindrical inner surface 226 of the rotating swivel body 156. The second substantially cylindrical outer surface 258 extends through the first substantially cylindrical inner surface 192 of the second swivel body 154 and extends within the first substantially cylindrical inner surface 226 of the rotating swivel body 156. A radially inwardly extending annular shoulder 262, lying in a plane substantially normal to the coaxial longitudinal axes of the second cylindrical outer surface 258 and the longitudinal passage 248, communicates with the second cylindrical outer surface 258. A third substantially cylindrical outer surface 264 extends from the annular shoulder 262 to a second radial end face 266 formed on the second end 246 of the tubular sleeve 158. The second radial end face 266 lies in a plane substantially normal to the coaxial axes of the third cylindrical outer surface 264 and the longitudinal passage 248. The third substantially cylindrical outer surface 264 extends within the second substantially cylindrical inner surface 228 of the rotating swivel body 156.

An annular groove 268 is formed in the first substantially cylindrical outer surface 252 of the tubular sleeve 158 and a resilient annular seal 270, preferably a Teflon O-ring, is disposed therein to provide a static high pressure seal between the tubular sleeve 158 and the first non-rotating swivel body 152. A dynamic resilient annular seal 272 is disposed intermediate and in mutual contact with the annular shoulder 262 of the tubular sleeve 158 and the annular shoulder 230 of the rotating swivel body 156. The dynamic annular seal 272 provides a rotating fluid-tight seal between the annular shoulder 262 of the tubular sleeve 158 and the annular shoulder 230 and cylindrical inner surface 226 of the rotating swivel body 156.

FIG. 2 illustrates the resilient annular seal 272 in the relaxed position prior to installation in the swivel joint 150. The resilient annular seal 272 comprises an annular resilient elastomeric member 272a, suitably formed of Buna-N, having a substantially cylindrically shaped outer periphery 272b and a substantially cylindrically shaped inner periphery 272c having a substantially arcuately shaped annular groove 272d formed therein. In a relaxed position, as shown in FIG. 2, the opposite end faces 272e and 272f of the annular seal communicate between the outer and inner peripheries 272b and 272c and are substantially frusto-conically shaped, each tapering axially inwardly and radially outwardly from its respective line of intersection with the inner periphery 272c. An annular metallic seal member 272g, having an L-shaped cross-section, is bonded to the exterior of the annular elastomeric member 272a along the line of intersection between the end face 272e and the outer periphery 272b with the outer surface of one leg of the metallic seal member 272g aligned substantially parallel with the outer periphery 272b and with the outer surface of the other leg of the metallic seal member 272g aligned substantially parallel with the end face 272e. A second L-shaped annular metallic seal member 272h, also having an L-shaped cross-section, is bonded to the exterior of the annular elastomeric member 272a along the line of intersection between the end face 272f and the outer periphery 272b with the outer surface of one leg of the metallic seal member 272h substantially aligned with the outer periphery 272b and with the outer surface of the other leg of the metallic seal member 272h substantially aligned with the end face 272f. The annular seal members 272g and 272h can be suitably formed of brass, bronze or stainless steel.

If the dynamic annular seal configuration employs only one L-shaped metallic seal member, such as that designated by the reference character 272h in FIG. 2, it will be understood that the annular seal 272 will be positioned such that the single L-shaped metallic seal member mutually engages the annular shoulder 262 of the tubular sleeve 158 and the first substantially cylindrical inner surface 226 of the rotating or third swivel body 156. This positioning of the L-shaped metallic seal member 272h prevents the extrusion of the annular resilient elastomeric member 272a between the second cylindrical outer surface 258 of the tubular sleeve 158 and the first cylindrical inner surface 226 of the rotating or third swivel body 156 upon the application of high pressure to the interior of the high pressure tubular swivel joint 150.

An annular piston 274, preferably constructed of Monel, is longitudinal slidingly disposed between the second substantially cylindrical inner surface 228 of the rotating swivel body 156 and the third substantially cylindrical outer surface 264 of the tubular sleeve 158. The annular piston 274 includes annular inner and outer grooves 276 and 278 formed therein with resilient annular seals 280 and 282, preferably Teflon O-rings, disposed respectively therein, which provide sliding and rotating sealing engagement between the annular piston 274 and the third cylindrical outer surface 264 of the tubular sleeve 158 and the second cylindrical inner surface 228 of the rotating swivel body 156, respectively. A quantity of liquid 284, preferably a hydrogen sulfide-resistant lubricant, is disposed in the annular space defined by the second cylindrical surface 228 of the rotating swivel body 156, the third cylindrical outer surface 264 and annular shoulder 262 of the tubular sleeve 158, the dynamic annular seal 272 and the annular piston 274.

An annular filter 286, having an L-shaped cross-section, is disposed intermediate the second end face 266 of the tubular sleeve 158 and the annular shoulder 234 of the rotating swivel body 156. One leg 288 of the annular filter 286 extends a short distance between the third cylindrical outer surface 264 of the tubular sleeve 158 and the second cylindrical inner surface 228 of the rotating swivel body 156. The annular filter 286 is preferably formed of a sintered metal such as sintered bronze.

The first and second non-rotating swivel bodies 152 and 154 and the rotating swivel body 156 may be suitably formed of 4140 stainless steel and the tubular sleeve 158 may be suitably formed of Monel.

The segmental, radially expansible and contractile clamp 160 is provided with internally facing annular wedging surfaces 290 and 292 which engage the complementary wedging surfaces 180 and 200 of the first and second non-rotating swivel bodies 152 and 154, respectively. Further details of the clamp 160, as well as alternative means of bringing the elements 152 and 154 to the conditions shown in FIG. 1 can be seen in the U.S. Pat. to Watts et al, Nos. 2,766,829; 2,766,998; 2,766,999 and 3,181,901 incorporated herein by reference.

It will be noted that in the high pressure tubular swivel joint 150 the clamp 160 can be removed from the first and second non-rotating swivel bodies 152 and 154 whereby they may be separated and the tubular sleeve 158 removed completely therefrom along with the static and dynamic annular seals 270 and 272. as well as the piston 274, filter 286 and liquid 284. Such convenient disassembly of the sealing elements of the high pressure tubular swivel joint of the present invention permits the convenient flushing and drainage of the interior of the swivel joint at the points of static and dynamic sealing and the convenient renewal of static and dynamic seals as well as associated tubular sleeves, filters, pistons and liquid.

Changes may be made in the construction and arrangement of parts or elements of the various embodiments described herein without departing from the spirit and scope of the present invention.

What is claimed is:

1. A swivel joint comprising:
a first swivel body having a first end, said first swivel body having an end face on the first end thereof, and a passage extending through said first swivel body communicating with the first end thereof;
a second swivel body having a first end and a second end, said second swivel body having an end face on the first end thereof, and a passage extending through said second swivel body communicating the first and second ends, said passage including a cylindrical inner surface;
a third swivel body having a first end and having a passage extending therethrough communicating with the first end thereof, and a cylindrical outer surface, the cylindrical outer surface of said third swivel body being disposed within the cylindrical inner surface of said second swivel body, said passage through said third swivel body including a first cylindrical inner surface communicating with the first end of said third swivel body, a second cylindrical inner surface having a diameter less than the diameter of the first cylindrical inner surface, a first annular shoulder extending between the first and second cylindrical inner surfaces, a third inner surface having a diameter less than the diameter of the second cylindrical inner surface, and a second annular shoulder extending between the second cylindrical inner surface and the third inner surface;
a sleeve having a first end and a second end and a passage extending therethrough communicating the first and second ends, said sleeve including: a first cylindrical outer surface communicating with the first end of said sleeve and received within the passage through said first swivel body; a second cylindrical outer surface intermediate the first cylindrical outer surface and the second end of said sleeve; a radially inwardly extending annular shoulder communicating with the second cylindrical outer surface of said sleeve; a third cylindrical outer surface extending from the annular shoulder to the second end of said sleeve; a first end face on the first end of said sleeve; and a second end face on the second end of said sleeve; the second cylindrical outer surface of said sleeve extending within the first cylindrical inner surface of said third swivel body and the third cylindrical outer surface of said sleeve extending within the second cylindrical inner surface of said third swivel body;
static annular seal means disposed intermediate the first end of said sleeve and the passage through said first swivel body for providing a fluid-tight seal therebetween;
dynamic annular seal means disposed intermediate the annular shoulder of said sleeve and the first cylindrical inner surface and the first annular shoulder of said third swivel body for providing a sliding, fluid-tight seal between said sleeve and said third swivel body;
an annular piston positioned in mutual sliding sealing engagement between the second cylindrical inner surface of said third swivel body and the third cylindrical outer surface of said sleeve;
a quantity of fluid disposed in the annular space defined by the second cylindrical inner surface of said third swivel body, the third cylindrical outer surface and the annular shoulder of said sleeve, said dynamic annular seal means and said annular piston;
rotary bearing means disposed intermediate the cylindrical outer surface of said third swivel body and the cylindrical inner surface of said second swivel body for journally supporting said third swivel body within said second swivel body for rotation about the axis of the cylindrical inner surface of said second swivel body; and
means for mutually securing said first swivel body, said second swivel body and said sleeve for preventing relative movement therebetween.

2. The swivel joint as defined in claim 1 characterized further to include:
an annular filter disposed between the second end face of said sleeve and the second annular shoulder of said third swivel body.

3. The swivel joint as defined in claim 2 characterized further to include:
first annular seal means interposed between the cylindrical outer surface of said third swivel body and the cylindrical inner surface of said second swivel body intermediate said rotary bearing means and the first end of said third swivel body for providing a fluid-tight seal between said third swivel body and said second swivel body; and
a passage formed in said second swivel body communicating between the cylindrical inner surface of said second swivel body intermediate said first annular seal means and the first end of said third swivel body and the end face of said second swivel body.

4. The swivel joint as defined in claim 3 characterized further to include:
a radially inwardly extending flange formed on the first end of said second swivel body adjacent the end face thereof;
second annular seal means interposed between the second cylindrical outer surface of said sleeve and the radially inwardly extending flange of said second swivel body for providing a fluid-tight seal between said sleeve and said second swivel body.

5. The swivel joint as defined in claim 1 wherein said dynamic annular seal means is characterized further to include:
   an annular resilient member having a cylindrically shaped outer periphery, a cylindrically shaped inner periphery, frusto-conically shaped opposite end faces each communicating between the inner and outer peripheries of said annular resilient member and tapering axially inwardly and radially outwardly from the respective line of intersection with the inner periphery; and
   an annular metallic seal member, having an L-shaped cross-section, bonded to said annular resilient member along the line of intersection between one end face and the outer periphery of said annular resilient member.

6. The swivel joint as defined in claim 1 wherein said dynamic annular seal means is characterized further to include:
   an annular resilient member having a cylindrically shaped outer periphery, a cylindrically shaped inner periphery, and frusto-conically shaped opposite end faces each communicating the inner and outer peripheries of said annular resilient member and tapering axially inwardly and radially outwardly from a respective line of intersection with the inner periphery; and
   a pair of annular metallic seal members, each having an L-shaped cross-section, bonded, respectively, to the exterior of said annular resilient member along the lines of intersection between the opposite end faces and the outer periphery of said annular resilient member.

7. The swivel joint as defined in claim 2 wherein said annular filter is formed of sintered metal.

8. The swivel joint as defined in claim 7 wherein said quantity of fluid is a hydrogen sulfide-resistant lubricant.

9. The swivel joint as defined in claim 1 characterized further to include:
   thrust bearing means mutually engaging said third swivel body and said second swivel body for preventing mutual displacement thereof along the axis of rotation of said third swivel body.

10. The swivel joint as defined in claim 1 wherein said sleeve is characterized further to include:
    an outwardly extending flange on the exterior thereof intermediate the first and second cylindrical outer surfaces.

11. A swivel joint comprising:
    a first swivel body having a first end and a second end, said first swivel body having an end face formed on the first end thereof and an outwardly extending flange formed thereon adjacent the first end thereof, a passage extending through said first swivel body communicating the first and second ends, said passage including: a first cylindrical inner surface communicating with the end face; a second inner surface having a diameter less than the first cylindrical inner surface; and an annular shoulder extending between said first and second cylindrical surfaces;
    a second swivel body having a first end and a second end, said second swivel body including: an end face formed on the first end thereof; an outwardly extending flange formed thereon adjacent the first end thereof; and a passage extending through said second swivel body communicating the first and second ends; said passage including: a first cylindrical inner surface communicating with the end face; a second cylindrical inner surface having a diameter greater than the first cylindrical inner surface; and an annular shoulder extending between said first and second cylindrical surfaces;
    a third swivel body having a first end and a second end and having a passage extending therethrough communicating the first and second ends thereof and having a cylindrical outer surface communicating with the first end thereof, the cylindrical outer surface of said third swivel body being disposed within the second cylindrical inner surface of said second swivel body with the first end of said third swivel body adjacent the annular shoulder of said second swivel body, said passage through said third swivel body including: a first cylindrical inner surface communicating with the first end of said third swivel body; a second cylindrical inner surface having a diameter less than the first cylindrical inner surface; a first annular shoulder extending between the first and second cylindrical inner surfaces; a third cylindrical inner surface having a diameter less than the diameter of the second cylindrical inner surface; and a second annular shoulder extending between the second and third cylindrical inner surfaces;
    a tubular sleeve having a first end and a second end and a passage extending therethrough communicating the first and second ends, an outwardly extending flange on the exterior of said sleeve intermediate the first and second ends, a first cylindrical outer surface formed on said sleeve extending from the flange to the first end of said sleeve and being received within the first cylindrical inner surface of said first swivel body, a second cylindrical outer surface formed on said sleeve extending from the flange toward the second end of said sleeve and having a diameter less than the diameter of the first cylindrical inner surface of said second swivel body and less than the diameter of the first cylindrical inner surface of said third swivel body, a radially inwardly extending annular shoulder communicating with the second cylindrical outer surface of said sleeve, a third cylindrical outer surface formed on said sleeve extending from the annular shoulder to the second end of said sleeve and having a diameter less than the diameter of the second cylindrical inner surface of said third swivel body, a first end face formed on the first end of said sleeve, a second end face formed on the second end of said sleeve, the second cylindrical outer surface of said sleeve extending through the first cylindrical inner surface of said second swivel body and within the first cylindrical inner surface of said third swivel body, and the third cylindrical outer surface of said sleeve extending within the second cylindrical inner surface of said third swivel body;
    static annular seal means disposed intermediate the first end of said tubular sleeve and the first cylindrical inner surface of said first swivel body for providing a fluid-tight seal between said sleeve and said first swivel body;
    dynamic annular seal means disposed intermediate the annular shoulder of said tubular sleeve and the first cylindrical inner surface and the annular shoulder of said third swivel body for providing a sliding fluid-tight seal between said sleeve and said third swivel body;

an annular piston positioned in mutual sliding sealing engagement between the second cylindrical inner surface of said third swivel body and the second cylindrical outer surface of said tubular sleeve;

a quantity of liquid disposed in the annular space defined by the second cylindrical inner surface of said third swivel body, the third cylindrical outer surface and the annular shoulder of said tubular sleeve, said dynamic annular seal means and said annular piston;

rotary bearing means disposed intermediate the cylindrical outer surface of said third swivel body and the second cylindrical inner surface of said second swivel body for journally supporting said third swivel body within said second swivel body for rotation about the axis of the second cylindrical inner surface of said second swivel body; and clamp means for mutually engaging the flanges of said first and second swivel bodies and engaging the outwardly extending flange of said tubular sleeve between the end faces of said first and second swivel bodies for preventing relative movement therebetween.

12. The swivel joint as defined in claim 11 characterized further to include:

an annular filter disposed between the second end face of said tubular sleeve and the second annular shoulder of said third swivel body.

13. The swivel joint as defined in claim 12 characterized further to include:

first annular seal means interposed between the cylindrical outer surface of said third swivel body and the second cylindrical inner surface of said second swivel body intermediate said rotary bearing means and the first end of said third swivel body for providing a fluid-tight seal between said third swivel body and said second swivel body; and a passage formed in said second swivel body communicating between the annular shoulder and the end face thereof.

14. The swivel joint as defined in claim 13 characterized further to include:

second annular seal means interposed between the second cylindrical outer surface of said tubular sleeve and the first cylindrical inner surface of said second swivel body for providing a fluid-tight seal between said tubular sleeve and said second swivel body.

15. The swivel joint as defined in claim 11 wherein said dynamic annular seal means is characterized further to include:

an annular elastomeric member having a cylindrically shaped outer periphery, a cylindrically shaped inner periphery, and frusto-conically shaped opposite end faces each communicating between the inner and outer peripheries of said annular elastomeric member and tapering axially inwardly and radially outwardly from the respective line of intersection with the inner periphery; and an annular metallic seal member, having an L-shaped cross-section, bonded to said annular elastomeric member along the line of intersection between one end face and the outer periphery of said annular elastomeric member.

16. The swivel joint as defined in claim 11 wherein said dynamic annular seal means is characterized further to include:

an annular elastomeric member having a cylindrically shaped outer periphery, a cylindrically shaped inner periphery, and frusto-conically shaped opposite end faces each communicating the inner and outer peripheries of said annular elastomeric member and tapering axially inwardly and radially outwardly from a respective line of intersection with the inner periphery; and a pair of annular metallic seal members, each having an L-shaped cross-section, bonded, respectively, to the exterior of said annular elastomeric member along the lines of intersection between the opposite end faces and the outer periphery of said annular elastomeric member.

17. The swivel joint as defined in claim 12 wherein said annular filter is formed of sintered bronze.

18. The swivel joint as defined in claim 17 wherein said quantity of liquid is a hydrogen sulfide-resistant lubricant.

19. The swivel joint as defined in claim 11 characterized further to include:

thrust bearing means mutually engaging said third swivel body and said second swivel body for preventing mutual displacement thereof along the axis of rotation of said third swivel body.

20. A swivel joint comprising:

a first swivel body having a first end and a second end, said first swivel body having an end face formed on the first end thereof and an outwardly extending flange formed thereon adjacent the first end thereof, a passage extending through said first swivel body communicating the first and second ends, said passage including a first cylindrical inner surface communicating with the end face, a second cylindrical inner surface having a diameter less than the first cylindrical inner surface and an annular shoulder extending between said first and second cylindrical surfaces;

a second swivel body having a first end and a second end, said second swivel body having an end face formed on the first end thereof and an outwardly extending flange formed thereon adjacent the first end thereof, a passage extending through said second swivel body communicating the first and second ends, said passage including a first cylindrical inner surface communicating with the end face, a second cylindrical inner surface having a diameter greater than the first cylindrical inner surface and an annular shoulder extending between said first and second cylindrical surfaces;

a third swivel body having a first end and a second end and having a passage extending therethrough communicating the first and second ends thereof and having a cylindrical outer surface communicating with the first end thereof and having a diameter less than the diameter of said second cylindrical inner surface of said second swivel body, the cylindrical outer surface of said third swivel body being disposed within the second cylindrical inner surface of said second swivel body with the first end of said third swivel body adjacent the annular shoulder of said second swivel body, said passage through said third swivel body including a first cylindrical inner surface communicating with the first end of said third swivel body, a second cylindrical inner surface having a diameter less than the first cylindrical inner surface, a first annular shoulder extending between the first and second cylindrical inner surfaces, a third cylindrical surface having a diameter less than the diameter of the second cylindrical inner surface, and a second annular shoulder extending between the second and third cylindrical inner surfaces;

a tubular sleeve having a first end and a second end and a passage extending therethrough communicating the first and second ends, an outwardly extending flange formed on the exterior of said sleeve intermediate the first and second ends, a first cylindrical outer surface formed on said sleeve extending from the flange to the first end of said sleeve and having a diameter slightly less than the diameter of the first cylindrical inner surface of said first swivel body and being received within the first cylindrical inner surface of said first swivel body, a second cylindrical outer surface formed on said sleeve extending from the flange toward the second end of said sleeve and having a diameter slightly less than the diameter of the first cylindrical inner surface of said second swivel body and slightly less than the diameter of the first cylindrical inner surface of said third swivel body, a radially inwardly extending annular shoulder communicating with the second cylindrical outer surface of said sleeve, a third cylindrical outer surface formed on said sleeve extending from the annular shoulder to the second end of said sleeve and having a diameter less than the diameter of the second cylindrical inner surface of said third swivel body, a first end face formed on the first end of said sleeve, a second end face formed on the second end of said sleeve, the second cylindrical outer surface of said sleeve extending through the first cylindrical inner surface of said second swivel body and within the first cylindrical inner surface of said third swivel body, and the third cylindrical outer surface of said sleeve extending within the second cylindrical inner surface of said third swivel body;

static annular seal means disposed intermediate the first end of said tubular sleeve and the first cylindrical inner surface of said first swivel body for providing a fluid-tight seal therebetween;

dynamic annular seal means disposed intermediate the annular shoulder of said tubular sleeve and the first cylindrical inner surface and the annular shoulder of said third swivel body for providing a sliding fluid-tight seal therebetween;

an annular piston positioned in mutual sliding sealing engagement between the second cylindrical inner surface of said third swivel body and the second cylindrical outer surface of said tubular sleeve;

a quantity of liquid disposed in the annular space defined by the second cylindrical inner surface of said third swivel body, the third cylindrical outer surface and annular shoulder of said tubular sleeve, said dynamic annular seal means and said annular piston;

rotary bearing means disposed intermediate the cylindrical outer surface of said third swivel body and the second cylindrical inner surface of said second swivel body for journally supporting said third swivel body within said second swivel body for rotation about the axis of the second cylindrical inner surface of said second swivel body; and clamp means for mutually engaging the flanges of said first and second swivel bodies and engaging the outwardly extending flange of said tubular sleeve between the end faces of said first and second swivel bodies for preventing relative movement therebetween.

* * * * *